United States Patent
Kamdar (10) Patent No.: US 9,298,357 B2
(45) Date of Patent: Mar. 29, 2016

(54) SYSTEMS AND METHODS FOR AUTO-ADJUST POSITIONING OF PREFERRED CONTENT FOR INCREASED CLICK AND CONVERSION RATES

(71) Applicant: Yahoo! Inc., Sunnyvale, CA (US)

(72) Inventor: Gaurav Kamdar, Bangalore (IN)

(73) Assignee: Yahoo! Inc., Sunnyvale, CA (US)

(*) Notice: Subject to any disclaimer, the term of this patent is extended or adjusted under 35 U.S.C. 154(b) by 344 days.

(21) Appl. No.: 13/903,669

(22) Filed: May 28, 2013

(65) Prior Publication Data

US 2014/0359479 A1    Dec. 4, 2014

(51) Int. Cl.
*G06F 3/0481* (2013.01)
*G06F 3/0485* (2013.01)
*G06Q 30/00* (2012.01)
*G06F 9/44* (2006.01)

(52) U.S. Cl.
CPC ............ *G06F 3/0485* (2013.01); *G06F 9/4443* (2013.01); *G06Q 30/00* (2013.01)

(58) Field of Classification Search
CPC ... G06F 3/0482; G06F 3/0485; G06F 3/0481; G06F 9/4443; G06F 3/04842
See application file for complete search history.

(56) References Cited

U.S. PATENT DOCUMENTS

| | | | |
|---|---|---|---|
| 2009/0249247 A1* | 10/2009 | Tseng et al. | 715/808 |
| 2011/0265002 A1* | 10/2011 | Hong et al. | 715/702 |
| 2013/0132891 A1* | 5/2013 | Lee | 715/785 |
| 2015/0128049 A1* | 5/2015 | Block et al. | 715/728 |

* cited by examiner

*Primary Examiner* — Namitha Pillai
(74) *Attorney, Agent, or Firm* — Mauriel Kapouytian Woods LLP; Elaine Lee; James Woods (57) ABSTRACT

A computer-implemented user notification method includes displaying, at user-accessible locations on a graphical display of a mobile device, notifications corresponding to user interest, preference, and frequency of interaction with particular applications or activities on the mobile device. By increasing ease of interaction with particular notifications and advertisements that are of increased importance and relevance for the user, a higher click through and conversion rate is anticipated.

20 Claims, 5 Drawing Sheets

SYSTEMS AND METHODS FOR AUTO-ADJUST POSITIONING OF PREFERRED CONTENT FOR INCREASED CLICK AND CONVERSION RATES

BACKGROUND

The use of mobile electronic devices has exploded over the last decade. From mobile devices, people make and receive telephone calls, send and receive electronic mail, surf the web, and text with various friends and acquaintances. Today's mobile devices are able to integrate multiple functionalities such as the capability of running multiple applications. In particular, some of these applications may generate trigger events that can result in the display of a notification. Because electronic devices can contain many applications, the potential for application-based notifications can become numerous and unwieldy, particularly if a user, often using one hand on increasingly sizable screens, is required to filter through a list of notifications that have accumulated to find any relevant or important messages.

Accordingly, there is a need for a more efficient and intuitive approach for organizing notifications on mobile electronic devices and providing users with instant and easy access to these notifications.

SUMMARY

In some embodiments, systems and techniques are disclosed that may be used to alert a user of a mobile device about an event, such as about the presence of a recently-received message, e.g., an e-mail, voice mail, or text message, or other form of event such as a change in song on a music player running in a background state. In general, when a message is first received (or another event is triggered), a portion of the message may be provided in an area that is outside the main area of a mobile device display, such as by scrolling information about the message through a traditional notification bar area of the device. A notification bar area is the typically-static area on a device that displays information such as bars for wireless signal strength, a remaining battery life indicator, an icon that shows the network over which wireless communication is occurring, etc. The main area of the graphical display of the mobile device is generally the central, largest area of a display where active programs are displayed, while supplemental elements are typically displayed around the periphery of the main area or over the main area in pop-up windows or similar graphical elements. In particular, the electronic device can include a notification module that can interface with one or more Application Programming Interfaces ("APIs") to generate various types of notifications while the device is in either a locked state or an unlocked state. Furthermore, the notification module can provide options for customizing notification settings.

In some embodiments, the mobile device can monitor notifications that are received from multiple applications. Responsive to receiving the notifications, the mobile device can control the manner in which the notifications are displayed while the mobile device is operating in a locked or an unlocked state. In some embodiments, the mobile device can allow a user to customize how notifications are displayed while the device is in the locked and/or the unlocked state. For example, the method can further comprise dynamically adjusting the position on the graphical display for notifications and other user interest content based on user interests and preferences. User interests and preferences may be explicitly defined by the user and/or may be gauged by implicitly evaluating user experience on the web and other known techniques. In addition, notifications can be displayed as a light semi-transparent one so as not to intrude the user's experience at any time.

However, the traditional notification bar location is not necessarily the most convenient for efficient and easy user access. A user holding a mobile device in one hand is often limited to using only his/her opposable thumb to scroll and select particular items on the screen. The limited available mobility restricts the range of easy access for a user to select certain portions of the screen, such as the status bar (traditionally located at the top of the screen) or the central area of the display, which can be quite distant from the edge of the screen given the increasing size of mobile devices. In some embodiments, the device will dynamically adjust the location of notifications for the user to select based on the dimensions of the mobile device, the orientation of the mobile device relative to the user, and/or techniques for monitoring areas of the screen most often clicked by the user.

DETAILED DESCRIPTION OF THE DRAWINGS

Figure 1:
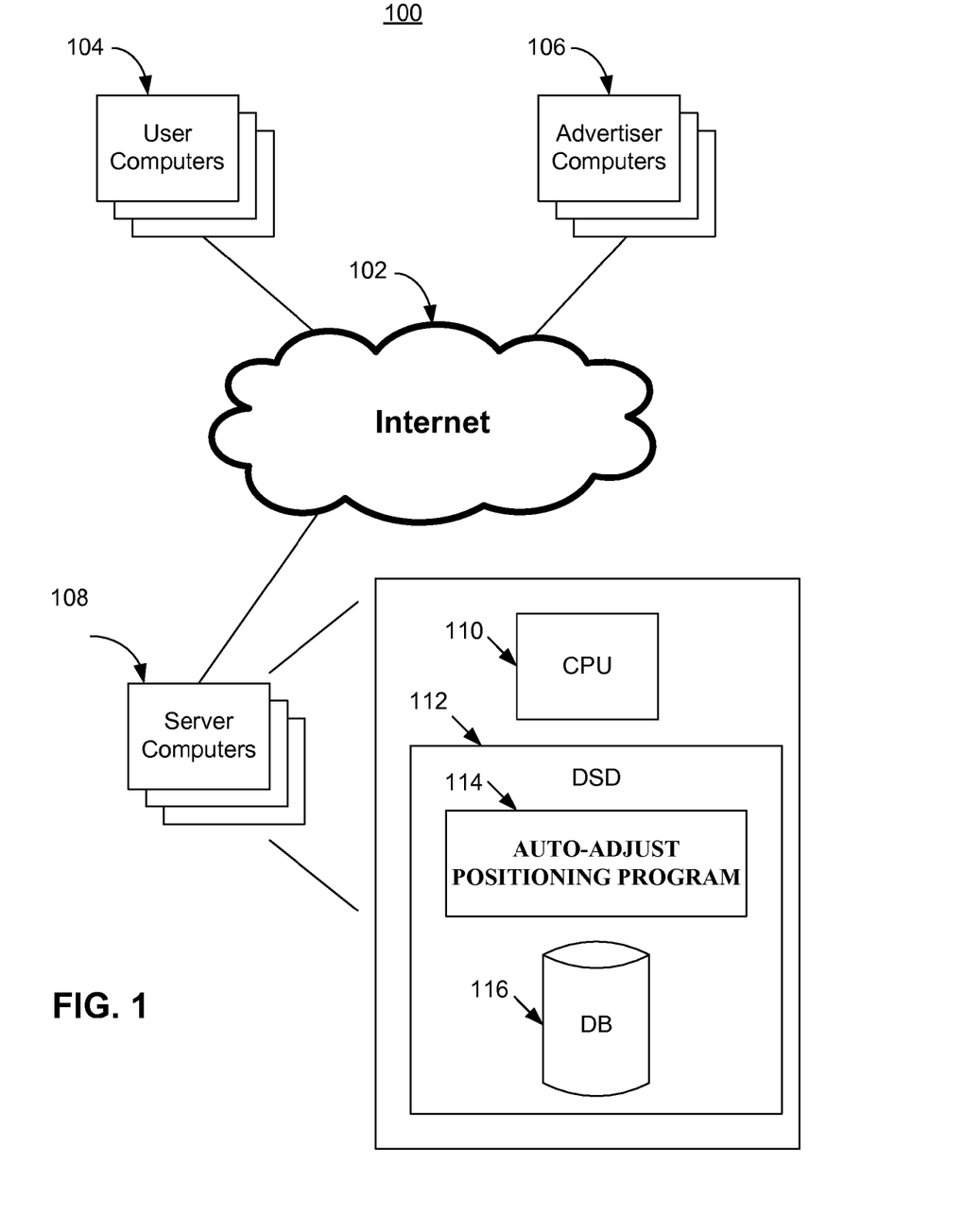
FIG. 1 is a distributed computer system according to one embodiment of the invention.

FIG. 1 is a distributed computer system 100 according to one embodiment of the invention. The system 100 includes user computers 104, advertiser computers 106 and server computers 108, all coupled or able to be coupled to the Internet 102. Although the Internet 102 is depicted, the invention contemplates other embodiments in which the Internet is not included, as well as embodiments in which other networks are included in addition to the Internet, including one more wireless networks, WANs, LANs, telephone, cell phone, or other data networks, etc. The invention further contemplates embodiments in which user computers 104 may be or include desktop or laptop PCs, as well as, wireless, mobile, or hand-held devices such as smart phones, PDAs, tablets, etc.

Each of the one or more computers 104, 106 and 108 may be distributed, and can include various hardware, software, applications, algorithms, programs and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, algorithms and software to enable searching, search results, and advertising, such as graphical or banner advertising as well as keyword searching and advertising in a sponsored search context. Many types of advertisements are contemplated, including textual advertisements, rich advertisements, video advertisements, etc.

As depicted, each of the server computers 108 includes one or more CPUs 110 and a data storage device 112. The data storage device 112 includes a database 116 and an Auto-Adjust Positioning Program 114.

The Program 114 is intended to broadly include all programming, applications, algorithms, software and other and tools necessary to implement or facilitate methods and systems according to embodiments of the invention. The elements of the Program 114 may exist on a single server computer or be distributed among multiple computers or devices.

Figure 2:
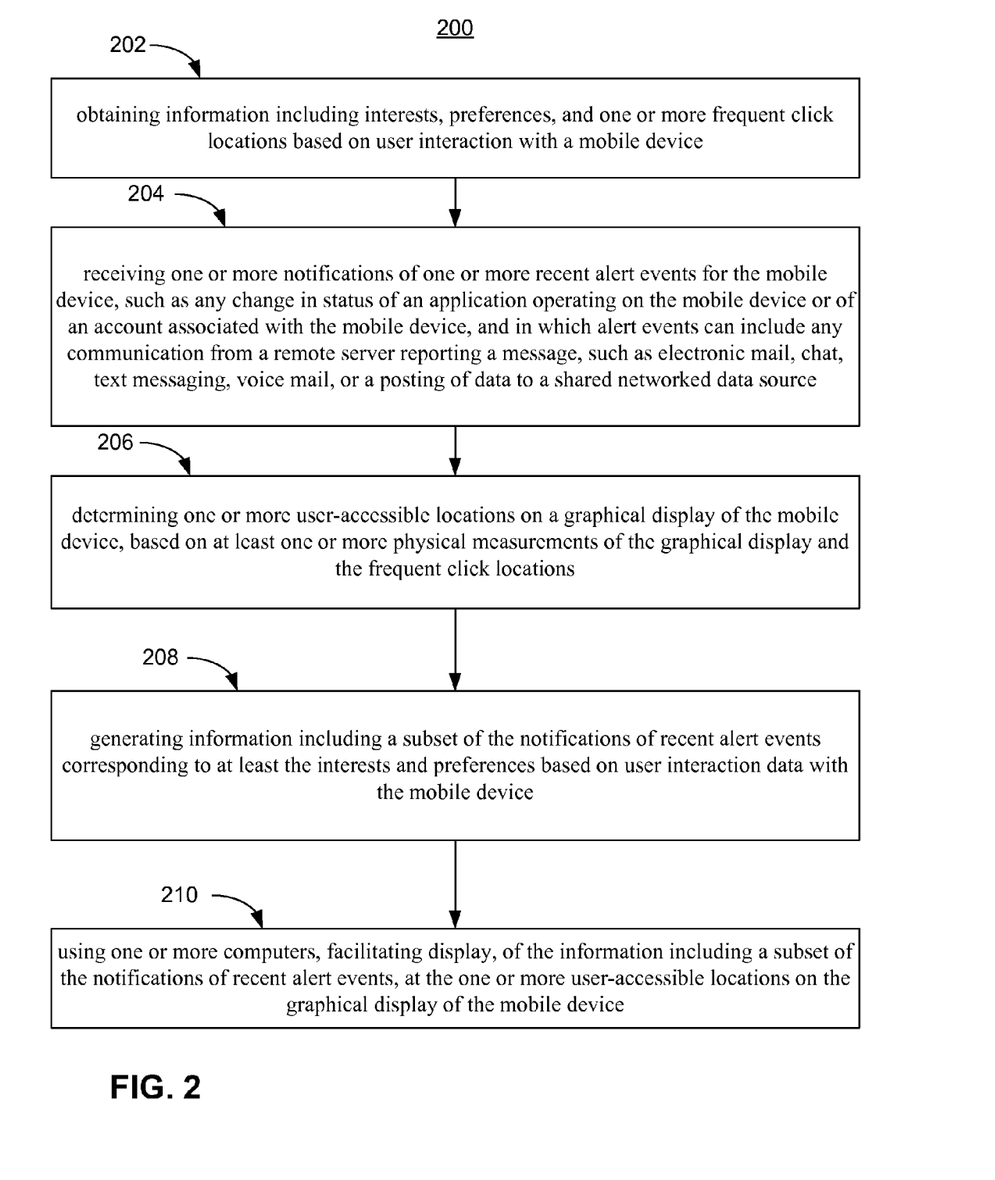
FIG. 2 is a flow diagram illustrating a method according to one embodiment of the invention.

FIG. 2 is a flow diagram illustrating a method 200 according to one embodiment of the invention.

Step 202 includes obtaining information including interests, preferences, and one or more frequent click locations based on user interaction with a mobile device.

Step 204 includes receiving one or more notifications of one or more recent alert events for the mobile device, such as any change in status of an application operating on the mobile device or of an account associated with the mobile device. Alert events can include any communication from a remote server reporting a message, such as electronic mail, chat, text messaging, voice mail, or a posting of data to a shared networked data source.

Step 206 includes determining one or more user-accessible locations on a graphical display of the mobile device, based on at least one or more physical measurements of the graphical display and the frequent click locations.

Step 208 includes generating information including a subset of the notifications of recent alert events corresponding to at least the interests and preferences based on user interaction data with the mobile device.

Step 210 includes using one or more computers, facilitating display, of the information including a subset of the notifications of recent alert events, at the one or more user-accessible locations on the graphical display of the mobile device.

Figure 3:
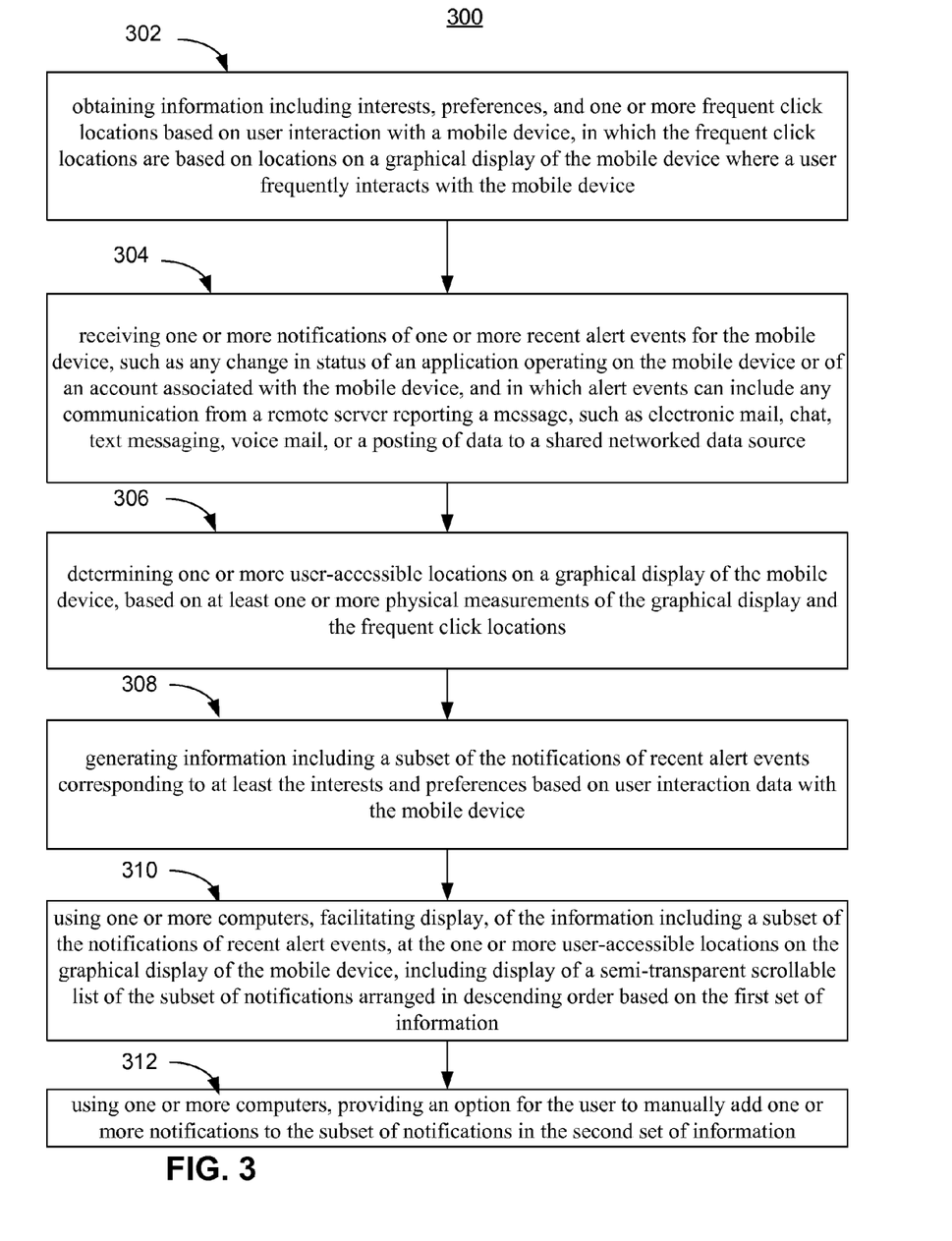
FIG. 3 is a flow diagram illustrating a method according to one embodiment of the invention.

FIG. 3 is a flow diagram illustrating a method 300 according to one embodiment of the invention.

Step 302 includes obtaining information including interests, preferences, and one or more frequent click locations based on user interaction with a mobile device, in which the frequent click locations are based on locations on a graphical display of the mobile device where a user frequently interacts with the mobile device.

Step 304 includes receiving one or more notifications of one or more recent alert events for the mobile device, such as any change in status of an application operating on the mobile device or of an account associated with the mobile device. Alert events can include any communication from a remote server reporting a message, such as electronic mail, chat, text messaging, voice mail, or a posting of data to a shared networked data source.

Step 306 includes determining one or more user-accessible locations on a graphical display of the mobile device, based on at least one or more physical measurements of the graphical display and the frequent click locations.

Step 308 includes generating information including a subset of the notifications of recent alert events corresponding to at least the interests and preferences based on user interaction data with the mobile device.

Step 310 includes using one or more computers, facilitating display, of the information including a subset of the notifications of recent alert events, at the one or more user-accessible locations on the graphical display of the mobile device, including display of a semi-transparent scrollable list of the subset of notifications arranged in descending order based on the first set of information.

Step 312 includes using one or more computers, providing an option for the user to manually add one or more notifications to the subset of notifications in the second set of information.

Figure 4:
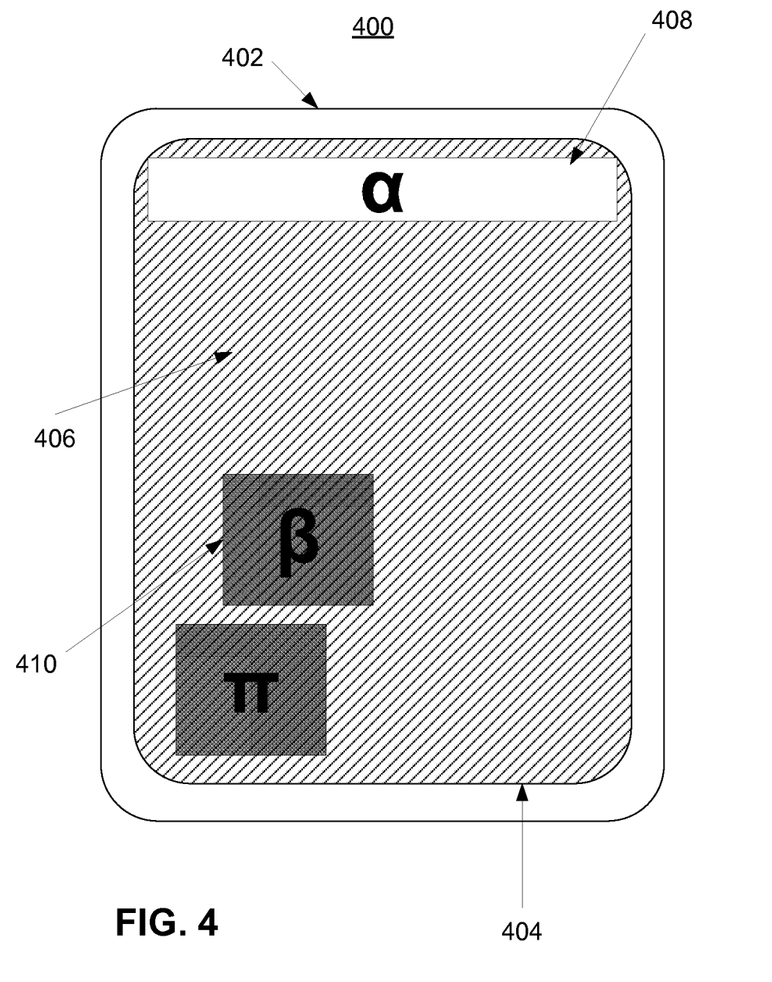
FIG. 4 is a block diagram illustrating one embodiment of the invention.

FIG. 4 is a block diagram 400 according to one embodiment of the invention. The mobile device 402 is comprised of a display screen 404 for the user to view content. The notification bar 408 is traditionally located at the top of display screen 404 on the mobile device 402. In one embodiment, an online video is playing on a full-screen browser 406 open on the display screen 404. User-preferred notifications will be displayed as semi-transparent icons 410 on the display screen 404. The user may select the icons 410, which would prompt the application or event corresponding to the user-preferred notifications to be displayed in the browser window 406. The location of the icons 410 is determined by the dimensions of the mobile device 402 and orientation relative to a user. In the present embodiment, the user is assumed to be left-handed and holding the mobile device 402 vertically with his left hand. Accordingly, the icons 410 are located along the middle to bottom left edge of the device to more easily enable his thumb to touch and/or click the icons 410 corresponding to the user-preferred notifications. In an alternative embodiment, the locations of the icons are based on at least user-interaction information indicating frequent interaction by a user at particular points of the display screen 404.

Figure 5:
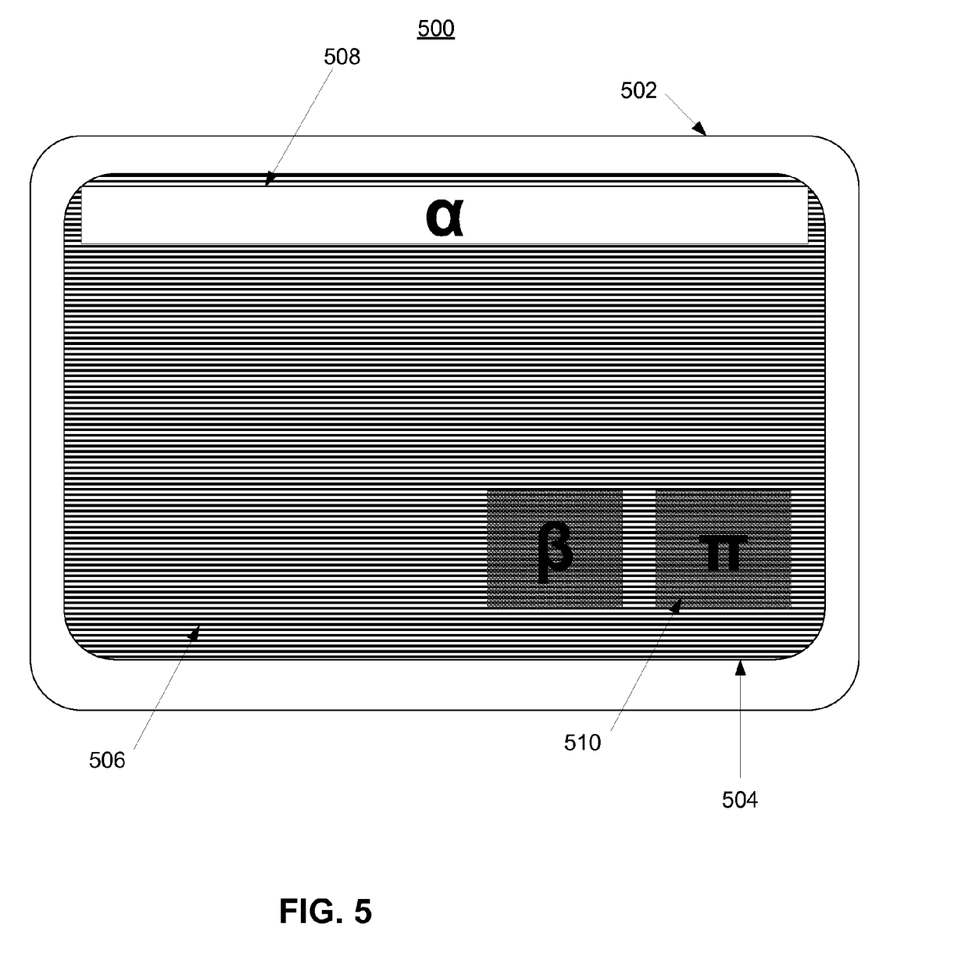
FIG. 5 is a block diagram illustrating one embodiment of the invention.

FIG. 5 is a block diagram 500 according to one embodiment of the invention. The mobile device 502 is comprised of a display screen 504 for the user to view content. The notification bar 508 is traditionally located at the top of display screen 504 on the mobile device 502. In one embodiment, an online full-screen browser 506 is open on the display screen 504. User-preferred notifications will be displayed as semi-transparent icons 510 on the display screen 504. The user may select the icons 510, which would prompt the application or event corresponding to the user-preferred notifications to be displayed in the browser window 506. The location of the icons 510 is determined by the dimensions of the mobile device 502 and orientation relative to a user. In the present embodiment, the user is assumed to be right-handed and holding the mobile device 502 horizontally with his right hand. Accordingly, the icons 510 are located along the bottom right edge of the device to more easily enable his thumb to touch and/or click the icons 510 corresponding to the user-preferred notifications. In an alternative embodiment, the locations of the icons are based on at least user-interaction information indicating frequent interaction by a user at particular points of the display screen 504.

Some embodiments of the invention include providing or utilizing a convenient location for preferred content or other information to be displayed, such as, for example, based at least in part on a user's interests. For example, a social networking Web site notification may arrive on a cell phone, such as if a contact sends the user a message. Without techniques according to some embodiments of the invention, such a notification could show up less effectively, such as bunched ineffectively with other notifications on the device. Some embodiments of the invention, however, may increase ease of use, convenience, and engagement of the user. For example, the user's Web browsing history, interactions on the social networking site, and other parameters may be utilized in determining that the message came from, for example, an identified close friend of the user. As such, it may be determined, for example, that this particular notification may best be isolated from the rest and shown in the middle area of a screen, where it may, for example, be easy to tap it with the thumb (left or right hand), or perhaps on the left middle, for a left-handed user, or right middle, for a right-handed user.

Another example could include an offer from a camera company, which may be determined to correspond to a user interest, which might otherwise get buried in the notification emails but, accordingly to an embodiment of the invention, may be placed, for example, in or near the middle of the screen. The notification may have been determined to correspond to a user interest because, for instance, it may be determined that the user has visited many Web pages including camera-related information or deals. In some embodiments, one or more machine learning techniques may also be utilized in, such as in determining user interests, for example.

In some embodiments, techniques are utilized that are equally applicable to left-handed or right-handed users, and work equally well for both, such as, for example, placing selected notifications in the middle area of a display. However, in some embodiments, techniques are utilized, or are also utilized, that are specific to left-handed or right-handed users. For example, for a left-handed user, notifications may be placed in the center left area of a display, and for right-handed users, in the center right area of a display, for example, so as to be more optimally, more easily, or more quickly reachable by the thumb of the user when the device is in use.

Some embodiments incorporate user personalization, such as in determining importance or prioritization of notifications, or in selected which notifications to place more prominently, etc. For example, in some embodiments, user Web browsing history or user behavior information may be obtained, analyzed and utilized, such as in determining user interests, etc., and collected information may also be securely stored, such as in one or more databases remote from the user device, for later use. Furthermore, in some embodiments, phone settings, or associated information, may be utilized or incorporated.

Furthermore, in some embodiments, collected information specific to a user, such as device settings, Web browsing information, interest information, etc., may be used even if the user switches or obtains another or a new device, such as a new smart phone, tablet, etc. For example, the collected information, and other newly collected information, can be used in determining notification placement for a different device, a new device, for cross-device applicability if the user switches between devices, etc. Also, in some embodiments, if a particular device may be used by multiple different users, the current user may be determined, and notification determination performed based on information and preferences relating to that user.

Still further, a user's preferences with regard to content or notifications on a particular type of device may also be taken into account. For example, a user may be determined to have a preference for longer articles when Web surfing on a PC, but may show a preference for short tweets when on a smart phone. In such a case, when the user is using the smart phone, notifications regarding tweets, or the tweets themselves, may be displayed prominently, etc.

In addition to notifications, some embodiments of the invention include providing customized content and payout, Web page presentation, Web personalization, etc., for example, to move or bring selected content within easy reach of the user or the user's thumb, such as in the middle, left middle, or right middle of a display, for example.

User interests and preferences, and associated weightings, etc., may be used in such selection, which can, in some embodiments, be viewed as applying a filter, in which only certain items are displayed most prominently, for example. In some embodiments, use of such filtering can be viewed as promoting greater user interest and interaction, and therefore may lead to greater monetization and profit.

While the invention is described with reference to the above drawings, the drawings are intended to be illustrative, and the invention contemplates other embodiments within the spirit of the invention.

The invention claimed is:

1. A method for dynamically auto-adjusting the position of notifications comprising:
   using one or more computers, obtaining a first set of information, wherein the first set of information comprises at least interests, preferences, and one or more frequent click locations based on at least user interaction data of a user with at least one mobile device;
   using one or more computers, receiving one or more notifications of one or more recent alert events for the at least one mobile device, wherein the alert events comprise any change in status of an application operating on the at least one mobile device or of an account associated with the at least one mobile device, and wherein the alert events further comprise any communication from a remote server reporting a message from one or more members of a group comprising electronic mail, chat, text messaging, voice mail, and a posting of data to a shared networked data source;
   using one or more computers, determining one or more user-accessible locations on a graphical display of the at least one mobile device, wherein the user-accessible locations are based on at least one or more physical measurements of the graphical display and the frequent click locations based on the user interaction data with the at least one mobile device;
   using one or more computers, based on at least the first set of information and the notifications of recent alert events, generating a second set of information, wherein the second set of information comprises a subset of the notifications of recent alert events corresponding to at least the interests and preferences based on user interaction data with the at least one mobile device; and
   using one or more computers, facilitating display of the second set of information at the one or more user-accessible locations on the graphical display of the mobile device, wherein the one or more user-accessible locations corresponding to the display of the second set of information is responsive to user input to acknowledge, deploy or display the alert events.

2. The method of claim 1, wherein the user-accessible locations are based on at least an orientation of the mobile device with respect to the user.

3. The method of claim 1, wherein the user-accessible locations are based on at least a specified location on the graphical display of the mobile device indicated by the user.

4. The method of claim 1, wherein the frequent click locations are based on locations on the graphical display of the mobile device where the user frequently interacts with the mobile device.

5. The method of claim 1, wherein the second set of information comprises one or more advertisements corresponding to at least the interests and preferences based on user interaction data with the mobile device.

6. The method of claim 1, wherein facilitating display of the second set of information further comprises displaying, on the graphical display of the mobile device, a semi-transparent scrollable list of the subset of notifications arranged in descending order based on the first set of information.

7. The method of claim 1, wherein facilitating display of the second set of information further comprises aggregating a plurality of icons that are each visually representative of the subset of the notifications.

8. The method of claim 1, further comprising:
using one or more computers, providing an option for the user to manually remove one or more notifications from the subset of notifications in the second set of information.

9. The method of claim 1, further comprising:
using one or more computers, providing an option for the user to manually add one or more notifications to the subset of notifications in the second set of information.

10. A system comprising:
one or more server computers coupled to a network; and
one or more databases coupled to the one or more server computers;
wherein the one or more server computers are for:
obtaining a first set of information, wherein the first set of information comprises at least interests, preferences, and one or more frequent click locations based on at least user interaction data of a user with at least one mobile device;
receiving one or more notifications of one or more recent alert events for the at least one mobile device, wherein the alert events comprise any change in status of an application operating on the at least one mobile device or of an account associated with the at least one mobile device, and wherein the alert events further comprise any communication from a remote server reporting a message from one or more members of a group comprising electronic mail, chat, text messaging, voice mail, and a posting of data to a shared networked data source;
determining one or more user-accessible locations of a graphical display on the at least one mobile device, wherein the user-accessible locations are based on at least one or more physical measurements of the graphical display and the frequent click locations based on the user interaction data with the at least one mobile device;
based on at least the first set of information and the notifications of recent alert events, generating a second set of information, wherein the second set of information comprises a subset of the notifications of recent alert events corresponding to at least the interests and preferences based on user interaction data with the at least one mobile device; and
facilitating display of the second set of information at the one or more user-accessible locations on the graphical display of the at least one mobile device, wherein the one or more user-accessible locations corresponding to the display of the second set of information is responsive to user input to acknowledge, deploy or display the alert events.

11. The system of claim 10, wherein the user-accessible locations are based on at least an orientation of the mobile device with respect to the user.

12. The system of claim 10, wherein the user-accessible locations are based on at least a specified location on the graphical display of the mobile device indicated by the user.

13. The system of claim 10, wherein the frequent click locations are based on locations on the graphical display of the mobile device where the user frequently interacts with the mobile device.

14. The system of claim 10, wherein the second set of information comprises one or more advertisements corresponding to at least the interests and preferences based on user interaction data with the mobile device.

15. The system of claim 14, wherein facilitating display of the second set of information further comprises displaying, on the graphical display of the mobile device, a semi-transparent scrollable list of the subset of notifications arranged in descending order based on the first set of information.

16. The system of claim 10, wherein facilitating display of the second set of information further comprises aggregating a plurality of icons that are each visually representative of the subset of the notifications.

17. The system of claim 10, wherein the server computers are further configured for:
providing an option for the user to manually remove one or more notifications from the subset of notifications in the second set of information.

18. The system of claim 10, wherein the server computers are further configured for:
providing an option for the user to manually add one or more notifications to the subset of notifications in the second set of information.

19. The system of claim 10, wherein facilitating display of the second set of information further comprises text that scrolls across the graphical display of the mobile device.

20. A non-transitory computer readable storage medium having stored thereon instructions for causing a computer to execute a method, the method comprising:
using one or more computers, obtaining a first set of information, wherein the first set of information comprises at least interests, preferences, and one or more frequent click locations based on at least user interaction data with at least one mobile device, wherein the frequent click locations are based on locations on a graphical display of the mobile device where a user frequently interacts with the at least one mobile device;
using one or more computers, receiving one or more notifications of one or more recent alert events for the at least one mobile device, wherein the alert events comprise any change in status of an application operating on the at least one mobile device or of an account associated with the at least one mobile device, and wherein the alert events further comprise any communication from a remote server reporting a message from one or more members of a group comprising electronic mail, chat, text messaging, voice mail, and a posting of data to a shared networked data source;
using one or more computers, determining one or more user-accessible locations on the graphical display of the at least one mobile device, wherein the user-accessible locations are based on at least one or more physical measurements of the graphical display and the frequent click locations based on the user interaction data with the at least one mobile device;
using one or more computers, based on at least the first set of information and the notifications of recent alert events, generating a second set of information, wherein the second set of information comprises a subset of the notifications of recent alert events corresponding to at least the interests and preferences based on user interaction data with the at least one mobile device; and
using one or more computers, facilitating display of the second set of information at the one or more user-accessible locations on the graphical display of the at least one mobile device, wherein facilitating display of the second set of information further comprises displaying, at the one or more user-accessible locations on the graphical display of the at least one mobile device, a semi-transparent scrollable list of the subset of notifications, wherein the one or more user-accessible locations corresponding to the display of the second set of information is responsive to user input to acknowledge, deploy or display one or more of the subset of notifications arranged in descending order based on the first set of information.

\* \* \* \* \*